US011988118B2

(12) United States Patent
Magnani et al.

(10) Patent No.: US 11,988,118 B2
(45) Date of Patent: May 21, 2024

(54) SELF-CLEANING DIPSTICK ASSEMBLY

(71) Applicant: LOMBARDINI S.R.L., Reggio Emilia (IT)

(72) Inventors: Alice Magnani, Reggio Emilia (IT); Vincenzo Perrone, Reggio nell'Emilia (IT); Massimiliano Bonanni, Parma (IT); Makio Hasuike, Milan (IT)

(73) Assignee: LOMBARDINI S.R.L. (IT)

( * ) Notice: Subject to any disclaimer, the term of this patent is extended or adjusted under 35 U.S.C. 154(b) by 0 days.

(21) Appl. No.: 17/881,237

(22) Filed: Aug. 4, 2022

(65) Prior Publication Data

US 2024/0044270 A1 Feb. 8, 2024

(51) Int. Cl.
| | |
|---|---|
| *F01M 11/12* | (2006.01) |
| *B08B 1/00* | (2006.01) |
| *B08B 1/16* | (2024.01) |
| *B08B 1/20* | (2024.01) |
| *B08B 13/00* | (2006.01) |
| *G01F 23/04* | (2006.01) |

(52) U.S. Cl.
CPC ............ *F01M 11/12* (2013.01); *B08B 1/165* (2024.01); *B08B 1/20* (2024.01); *B08B 13/00* (2013.01); *G01F 23/045* (2013.01)

(58) Field of Classification Search
CPC ............ F01M 11/12; F01M 2011/1453; B08B 1/005; B08B 1/02; B08B 13/00; G01F 23/045
See application file for complete search history.

(56) References Cited

U.S. PATENT DOCUMENTS

| | | | | |
|---|---|---|---|---|
| 3,387,314 | A | | 6/1968 | Marion |
| 3,460,181 | A | * | 8/1969 | Denver ................. G01F 23/045 73/290 R |
| 4,017,935 | A | * | 4/1977 | Hernandez ........... G01F 23/045 33/725 |
| 4,110,909 | A | | 9/1978 | Mayr et al. |
| 4,558,520 | A | * | 12/1985 | Forde, Jr. ............. G01F 23/045 33/725 |
| 4,942,669 | A | * | 7/1990 | Schnedl .................. G01F 23/04 33/725 |
| 5,099,584 | A | * | 3/1992 | Williams .............. G01F 23/045 33/728 |
| 5,765,255 | A | * | 6/1998 | Bychkowsky ........ G01F 23/045 15/210.1 |
| 6,018,882 | A | * | 2/2000 | Brousseau .............. G01B 3/00 33/725 |

(Continued)

FOREIGN PATENT DOCUMENTS

| | | |
|---|---|---|
| CN | 201884093 U | 6/2011 |
| CN | 213598036 U | 7/2021 |

(Continued)

*Primary Examiner* — Grant Moubry
(74) *Attorney, Agent, or Firm* — The Belles Group, P.C.

(57) ABSTRACT

A dipstick assembly includes a first handle attached to an end of the rod, a second handle including a second handle opening configured to receive the first handle and the rod, and a cleaning pad disposed at the bottom end of the second handle. The cleaning pad is configured to receive the rod and contact the rod to clean the rod when the first handle and rod are moved vertically relative to the second handle and cleaning pad.

19 Claims, 5 Drawing Sheets

(56) References Cited

U.S. PATENT DOCUMENTS

| | | | | |
|---|---|---|---|---|
| 6,029,509 | A * | 2/2000 | Singarella | G01F 23/045 15/220.4 |
| 7,578,071 | B2 * | 8/2009 | Goldstein | G01F 23/045 401/122 |
| 8,272,140 | B2 * | 9/2012 | Goldstein | A45D 40/267 401/122 |
| 10,648,378 | B2 | 5/2020 | Demeulenaere et al. | |
| 11,331,690 | B2 * | 5/2022 | Butvin | B44D 3/08 |
| 2008/0072445 | A1 * | 3/2008 | Harrison | G01F 23/045 33/725 |
| 2011/0061254 | A1 * | 3/2011 | Armistead | G01F 23/04 33/725 |
| 2021/0096015 | A1 * | 4/2021 | Kurtovic | F01M 11/12 |
| 2021/0246816 | A1 | 8/2021 | Rosenberger | |
| 2021/0254520 | A1 | 8/2021 | Rosenberger | |

FOREIGN PATENT DOCUMENTS

| | | | |
|---|---|---|---|
| DE | 2547177 | A1 | 5/1977 |
| DE | 7712869 | U1 | 2/1979 |
| DE | 4443122 | A1 | 3/1996 |
| EP | 0825423 | A1 | 2/1998 |
| FR | 1090791 | A | 4/1955 |
| GB | 771402 | A | 4/1957 |
| GB | 996776 | A | 6/1965 |
| JP | H078514 | U | 2/1995 |
| KR | 950003587 | Y1 | 12/1991 |
| KR | 20000001562 | U | 1/2000 |
| KR | 20050048232 | A | 5/2005 |
| WO | 2020064202 | A1 | 4/2020 |

\* cited by examiner

SELF-CLEANING DIPSTICK ASSEMBLY

FIELD

The present application relates to a dipstick assembly for checking an oil level and/or oil clarity in a combustion engine. More specifically, the present application is related to a self-cleaning dipstick assembly for a combustion engine.

BACKGROUND

Combustion engines are used in a wide variety of applications. Routine maintenance must be performed on combustion engines to prevent engine malfunction and extend the working life of the engine. Routine maintenance of combustion engines requires checking the oil in a reservoir associated with the combustion engine. An oil level may be checked to determine if there is a sufficient amount of oil in the reservoir. The clarity (e.g., cleanliness, quality) of the oil may be checked to determine if the oil in the reservoir should be changed (e.g., replaced). The oil may be checked, for example, after oil in the reservoir has been changed to confirm a quantity and quality of the oil in the reservoir.

BRIEF DESCRIPTION OF THE DRAWINGS

Exemplary embodiments of the present disclosure are described herein with reference to the following drawings, according to an exemplary embodiment.

DETAILED DESCRIPTION

Before turning to the figures, which illustrate certain exemplary embodiments in detail, it should be understood that the present disclosure is not limited to the details and methodology set forth in the detailed description or illustrated in the figures. It should be understood that the terminology used herein is for the purpose of description only and should not be regarded as limiting.

When a component, element, device, or the like of the present disclosure is described as having a purpose or performing an operation, function, or the like, the component, device, or element should be considered herein as being "configured to" meet that purpose or to perform that operation or function.

The oil in a reservoir associated with a combustion engine is often checked with a measuring tool that is stored within the oil reservoir when the reservoir is closed. The measuring tool may be attached to a cap or lid for the oil reservoir. Checking the oil requires a user to remove the measuring tool from the reservoir and clean excess oil off of the measuring tool before re-inserting the measuring tool into the reservoir to measure a level of oil in the reservoir. A user may clean the excess oil off of the measuring tool using, for example, a rag.

Described herein are dipstick assemblies and methods for checking an oil level in a combustion engine. The dipstick assemblies described herein include a rod for measuring an oil level in an oil reservoir or an oil pan associated with a combustion engine. The rod or a portion of the rod may be disposed within the oil reservoir when the dipstick assembly is not in use. The dipstick assemblies described herein include features for removing oil from the rod for measuring an oil level. The features for removing oil from the rod may be selectively employed, such that the rod may be removed from the oil reservoir in an operation that removes oil from the rod and in an operation that does not remove oil from the rod. The dipstick assemblies include "self-cleaning" features (e.g., a cleaning pad or cleaning element) so that a user does not need to use a rag, or another implement to remove excess oil from the rod before measuring the oil level in the reservoir. The dipstick assemblies described herein allow a user to measure the contents of an oil reservoir without risk of dirtying the user's hands. Additionally, the dipstick assemblies described herein prevent dirt and other debris from accumulating on or near the cleaning features of the dipstick assemblies.

Figure 1:
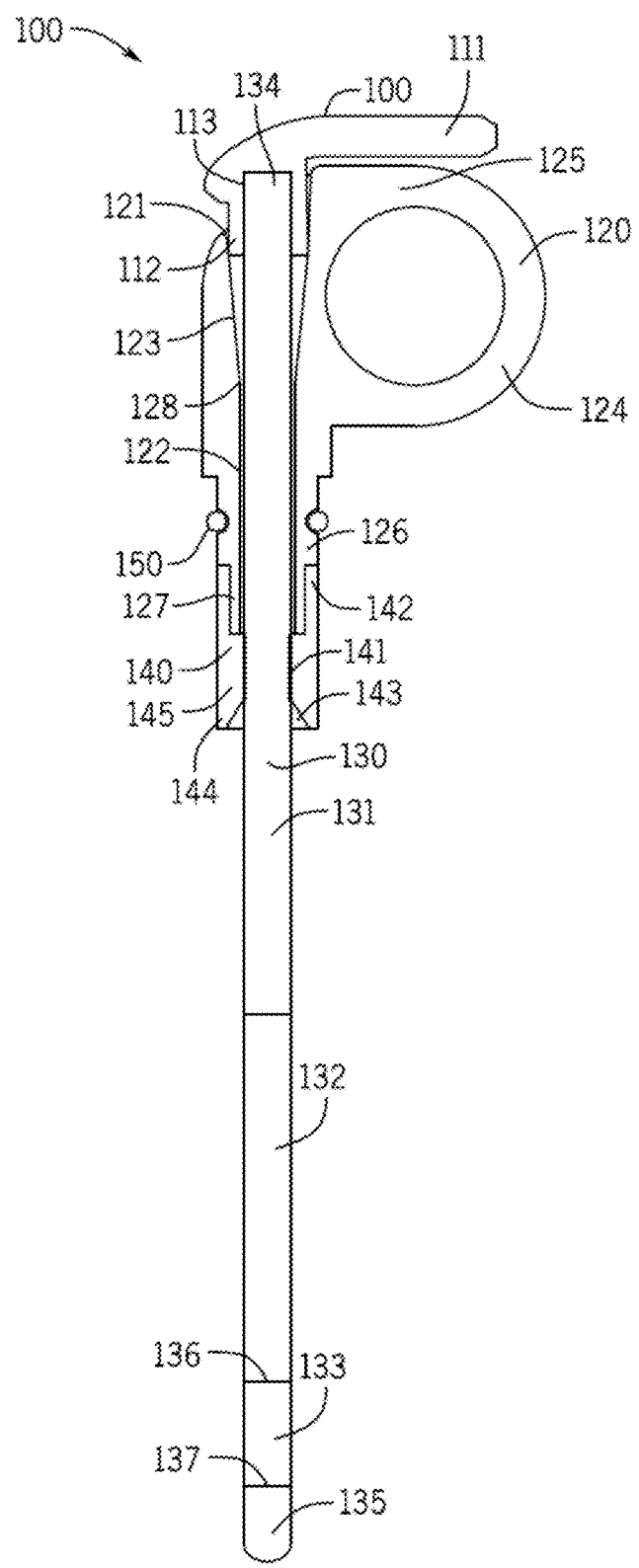
FIG. 1 illustrates a side cross-sectional view of a dipstick assembly according to an exemplary embodiment of the present disclosure.

FIG. 1 illustrates a side cross-sectional view of a dipstick assembly 100 according to an exemplary embodiment of the present disclosure. The dipstick assembly 100 includes a first handle 110, a second handle 120, a rod 130, and a cleaning element or cleaning pad 140. The first handle 110 is attached or connected to the rod 130 and the cleaning element 140 is attached or coupled to a bottom end of the second handle 120. FIG. 1 illustrates the dipstick assembly 100 in a position in which the first handle 110 and the rod 130 are accommodated within the second handle 120. The dipstick assembly 100 is configured such that the first handle 110 and the rod 130 may be moved relative to the second handle 120 and the cleaning element 140. For example, the first handle 110 and the rod 130 may be withdrawn from or inserted into the second handle 120. Further, the rod 130 may be withdrawn from or inserted through the cleaning element 140.

The second handle 120 includes a second handle opening 121 configured to receive the first handle 110 and the rod 130 when the first handle 110 and the rod 130 are inserted into the second handle 120. The cleaning element 140 is configured to receive the rod 130 when the rod 130 is inserted into the second handle 120. The cleaning element 140 is configured to contact the rod 130 when the rod 130 is moved relative to the cleaning element 140. The cleaning element 140 is configured to remove oil from the rod 130 when the first handle 110 and the rod 130 are moved relative to the second handle 120 and the cleaning element 140, for example, when the first handle 110 and the rod 130 are moved vertically relative to the second handle 120 and the cleaning element 140.

A cleaning element interior surface 141 may correspond to (e.g., be the same as) a cross-sectional shape of the rod 130. In some examples, the cleaning element interior surface 141 and a cross section of the rod 130 may have a rectangular shape. In other examples, the cleaning element interior surface 141 and a cross section of the rod 130 may have an oblong shape. In some examples, the cleaning element interior surface 141 may have the same shape as a cross section of the rod 130; however, the shape formed by the cleaning element interior surface 141 may be slightly smaller than the cross section of the rod 130. The cleaning element interior surface 141, being slightly smaller than but the same shaped as a cross section of the rod 130, may contact the rod 130 when the rod is moved relative to the cleaning element 140

The second handle 120 includes a second handle opening 121 configured to receive the rod 130 and the first handle 110 when the rod 130 and first handle 110 are inserted into the second handle 120. The second handle opening 121 may be located at or near the second handle top end 125. The second handle 120 further includes a second handle channel 122 extending from the second handle opening 121 through the second handle 120 to the second handle bottom end 126. In some examples, the second handle channel 122 may have a shape (i.e., a cross-sectional shape) corresponding to the shape of the rod 130. For example, the second handle channel may have a rectangular or an oblong shape. The second handle channel 122 may include a channel converging portion 123. The converging portion 123 may extend from the second handle opening 121 to a narrow end 128 of the converging portion 123. The cross-sectional area of the converging portion 123 may gradually decrease from a largest cross-sectional area at the second handle opening 121 to a smallest cross-sectional area at the narrow end 128 of the converging portion 123. The shape and cross-sectional are of the narrow end 128 of the converging portion 123 of the second handle channel 122 may be the same as the shape and cross-sectional area formed by the cleaning element inner surface 141.

As illustrated in FIG. 1, the converging portion 123 of the second handle channel 122 may be configured to accommodate a portion of the first handle 110 (e.g., a connecting portion 112) and a portion of the rod 130. The second handle 120 further includes a grip area. In some examples, as illustrated in the FIG. 1, the grip area may include an annular ring 124. In other examples, the grip area may be oblong and extend in the horizontal direction. The second handle 120 further includes a recessed portion 127. The recessed portion 127 may be located at or near the second handle bottom end 126. The recessed portion 127 may be configured to be circumscribed by the cleaning element 140. The cleaning element 140 may be attached or secured to the recessed portion 127 of the of the second handle 120. The second handle 120 may be comprised of a plastic, resign, metal, or other material. In some examples, the second handle 120 may be comprised of an oleophobic material. In other examples, one or more oleophobic coatings may be applied to the second handle.

The first handle 110 includes a grip portion 111 and a connecting portion 112. In one example, as illustrated in FIG. 1, the grip portion 111 may be oblong and extend in a horizontal direction. The grip portion 111 may be configured such that a user may grab or hold the grip portion 111 of the first handle 110. In some operations, a user may hold only the grip portion 111 of the first handle 110. In other operations, a user may hold the grip portion 111 of the first handle and the annular ring 124 of the second handle 120.

The connecting portion 112 of the first handle 110 may include a cavity 113. The cavity 113 may be configured to receive the rod 130, circumscribing a portion of the rod 130. The cavity 113 may be configured to receive a rod first end 134. The cavity 113 may attach or secure the first handle 110 to the rod 130. In some examples the cavity 113 may expand and deform to receive the rod first end 134. In these examples, a natural tendency of the material comprising the first handle 110 to return to its original shape may cause a compressive force to act on the rod first end 134 attaching or securing the first handle 110 to rod 130. In other examples, a glue or another adhesive may be used to secure the rod first end 134 within the cavity 113. The first handle 110 may be comprised of a plastic, a resin, or a metal. In some examples, the first handle 110 may be comprised of an oleophobic material. In other examples, one or more oleophobic coatings may be applied to the first handle 110.

The rod 130 is attached or secured to the first handle 110. The rod 130 may be attached or secured within the internal cavity 113 of the first handle 110. In some examples, as illustrated in FIG. 1, the rod 130 may have a rectangular cross-sectional shape. The cross-sectional shape of the rod 130 may vary. For example, in another example, the rod 130 may have an oblong or a circular cross-section. The second handle channel may have the same shape as the cross section of the rod 130. The cross sectional shape of the rod 130 may be smaller than the cross sectional shape of the first handle 110. The cleaning element interior surface 141 may be the same shape as the cross section of the rod 130. The rod 130 may be configured to extend out the second handle bottom end 126 when a portion of the first handle 110 and a portion of the rod 130 are accommodated in the second handle 120 as illustrated in FIG. 1. The rod 130 may be configured to extend into an oil reservoir (e.g., an oil pan) coupled to and fluidly connected with a combustion engine.

The rod 130 may include a connecting element 131 and a measuring element 132. The connecting element 131 may have a rectangular cross section. The cross section of the connecting element may vary. For example, the connecting element 131 may have an oblong or a circular cross section. The connecting element 131 may include the rod first end 134 (i.e., top end). The connecting element 131 may extend from the rod first end 134 to the measuring element 132. The connecting element 131 may be attached or secured to the first handle 110. The connecting element 131 may be configured to be inserted into the cavity 113 of the first handle 110. In some examples, the connecting element 131 may extend out the second handle bottom end 126 when the first handle 110 and the rod 130 are accommodated in the second handle 120 as illustrated in FIG. 1. In other examples, the measuring element 132 of the rod 130 may extend out the second handle bottom end 126 when the first handle 110 and the rod 130 are accommodated in the second handle 120. In some examples, the connecting element 131 may be comprised of a metal or a metal alloy. For example, the connecting element 131 may be comprised of an aluminum alloy. In other examples, the connecting element may be comprised of a plastic or polymer material.

The measuring element 132 of the rod may include the rod second end 135, (e.g., bottom end) of the rod 130. The measuring element 132 may extend from the connecting element 131 to the rod second end 135. The measuring element 132 may have a rectangular cross section. The cross section of the connecting element may vary. For example, the measuring element 132 may have an oblong or a circular cross section. In some examples, the connecting element 131 and the measuring element may have the same cross-sectional shape. In other examples, the connecting element 131 and the measuring element 132 may have a different cross-sectional shape. In some examples, the connecting element 131 and the measuring element 132 may have the same cross-sectional area. In other examples, the connecting element 131 element and the measuring element 132 may have a different cross-sectional area. For example, the connecting element 131 may have a larger cross-sectional area than the measuring element 132. In another example, the measuring element 132 may have a smaller cross-sectional area than the connecting element 131. In some examples, the measuring element 132 may be comprised of metal or a metal alloy. For example, the measuring element may be comprised of an aluminum alloy. In other examples, the measuring element 132 may be comprised of a plastic or polymer material.

The rod 130 may include a measuring area 133 disposed proximate to the rod second end 135. The measuring area 133 may be disposed on the measuring element 132. In some examples, the measuring area 133 may be disposed only on a single side of the rod 130 (e.g., a single side of the measuring element 132). In other examples, the measuring area 133 may be disposed on two or more sides of the rod 130. The measuring area 133 may include one or more markings configured to indicate an oil level in a reservoir. For example, the measuring area 133 may include a top marking 136 and a bottom marking 137. The top marking may indicate a maximum oil level in the reservoir. The bottom marking 37 may indicate a minimum oil level in the reservoir. In some examples, the measuring area 133 may be textured, for example the measuring area 133 may have ridges and/or grooves. A textured measuring area may allow a user to more easily read (e.g., see) the amount of oil present within the measuring area 133 of the rod 130. In some examples, the connecting element 131 and the measuring element 132 may be comprised of the same material or materials. In other examples, the connecting element 131 and the measuring element 132 may be comprised of different materials.

The cleaning element 140 may be disposed at the second handle bottom end 126. The cleaning element 140 may include a cleaning element protruding section 142 the cleaning element protruding section 142 may be configured to circumscribe the recessed portion 127 of the second handle 120 attaching or securing the cleaning element 140 to the second handle. The cleaning element protruding section 142 may circumscribe the recessed portion 127 of the second handle 120. In some examples, the cleaning element may be configured to elastically deform to circumscribe the recessed portion 127 of the second handle 120. In these examples, the cleaning element 140 may apply a compressive force on the recessed portion 127 securing the cleaning element 140 to the second handle 120. In some examples, the cleaning element 140 may be removed from the second handle 120. For example, the cleaning element 140 may be removed for replacement and/or cleaning. In other examples, glue or adhesive may be used to secure the cleaning element 140 to the second handle 120.

The cleaning element 140 is configured to contact the rod 130 when the rod is moved relative to the cleaning element 140. The cleaning element 140 may be configured to contact the rod 130 (e.g., the measuring element 132) to remove oil from the rod 130 when the rod 130 is moved relative to the cleaning element 140. In some examples, the cleaning element 140 may include a wiper that wipes the oil from the rod 130 so that it can fall back into the reservoir. In some examples, the cleaning element 140 may be comprised of an oleophobic material. In other examples, one or more oleophobic coatings may be applied to the cleaning element 140.

The cleaning element 140 may further include an oil catch 143 located at a cleaning element bottom end 144. The cleaning element interior surface 141 may diverge toward the cleaning element outer surface 145 proximate to the cleaning element bottom end 144 to form the oil catch 143. As the rod 130 is moved relative to the cleaning element 140 (e.g., moved vertically) oil on the rod 130 may be caught in the oil catch 143 as the oil is remove from the surface of the rod 130.

In some examples the dipstick assembly 100 may further include an O-ring 150. The O-ring 150 may be secured to and circumscribe the second handle 120 and be configured to couple the second handle 120 within an opening formed in an oil reservoir. In some examples, as illustrated in FIG. 1, the dipstick assembly 100 may include a single O-ring 150. In other examples, two or more O-rings may be included.

Figure 2:
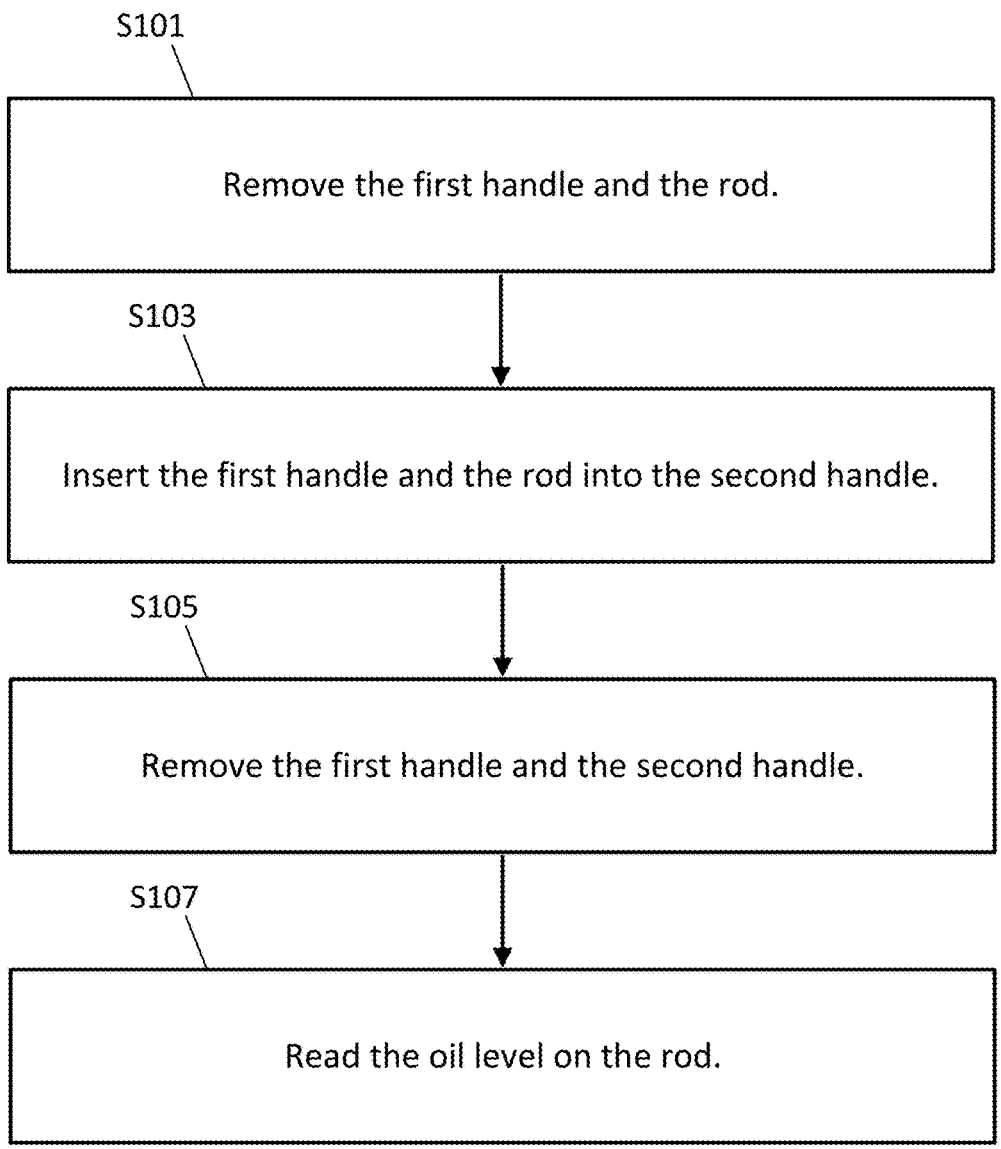
FIG. 2 illustrates a flow chart for a method of checking an oil level according to an exemplary embodiment of the present disclosure.

FIG. 2 illustrates a flow chart for a method of checking an oil level according to an exemplary embodiment of the present disclosure. The method of FIG. 2 may be used with various embodiments of the dipstick assemblies described herein to check the level of oil in an oil reservoir. For example, the method of FIG. 2 may be used in combination with the dipstick assembly 100 of FIG. 1 to check an oil level in an oil reservoir. The method of FIG. 2 may begin with the first handle 110 and rod 130 accommodated in the second handle 120. Additional, fewer, or different acts may be provided.

At act S101, the first handle 110 and the rod 130 are removed from the second handle 120. At act S101, the rod 130 is removed from an oil reservoir through the second handle 120. As the rod 130 is removed through the second handle 120, the cleaning element interior surface 141 of the cleaning element 140 disposed at the second handle bottom end 126 contacts the rod 130. The rod 130 may be moved vertically relative to the second handle 120. In some embodiments, where the rod 130 and first handle 110 are disposed within the second handle so as to be at an angle, the first handle 110 and rod 130 may be moved both vertically and horizontally as the first handle 110 and rod 130 are removed from the second handle 120. As the cleaning element interior surface 141 contacts the surface of the rod 130, oil may be removed from the surface of the rod 130. The oil removed from the surface of the rod 130 may be caught in the oil catch 143 of the cleaning element 140, preventing oil from traveling into the second handle channel 122. An oleophobic material and/or coating of the cleaning element 140 may cause the oil removed from the rod 130 to fall back into the reservoir as the rod 130 is removed or withdrawn from the second handle. The first handle 110 and the rod 130 may be removed from the second handle 120 using the grip portion 111 of the first handle. At act S101, the second handle 120 may remain disposed in an opening of the oil reservoir.

At act S103, the first handle 110 and the rod 130 are inserted into the second handle 120. The rod 130 is inserted through the second handle 120 to extend into the oil reservoir. The first handle 110 and the rod 130 may be inserted into the second handle using the grip portion 111 of the first handle 110.

At act S105, the first handle 110 and the second handle 120 are removed from an opening of the oil reservoir. The first handle 110 and the second handle 120 may be removed using the grip portion 111 of the first handle 110 and the annular ring 124 of the second handle 120. When the first handle 110 and the second handle 120 are removed together the rod 130 does not move relative to the second handle 120 and the cleaning element 140. Accordingly, oil is not removed from the surface of the rod 130. The first handle 110 and the second handle 120 may be removed vertically from the opening in the oil reservoir.

At act S107, an oil level on the rod is read (e.g., measured). At act S107, after the first handle 110 and the second handle 120 have been removed from the opening in the oil reservoir, oil will be visibly present on the rod 130. For example, oil may be visibly present on the measuring area 133 of the rod 130. The first mark 136 and/or second mark 137 in the measuring area may be used to determine an amount of oil in the oil reservoir. After the oil level on the rod 130 is read or measured, the first handle 110 (and rod 130) and the second handle 120 may be inserted into the opening in the oil reservoir.

Figure 3:
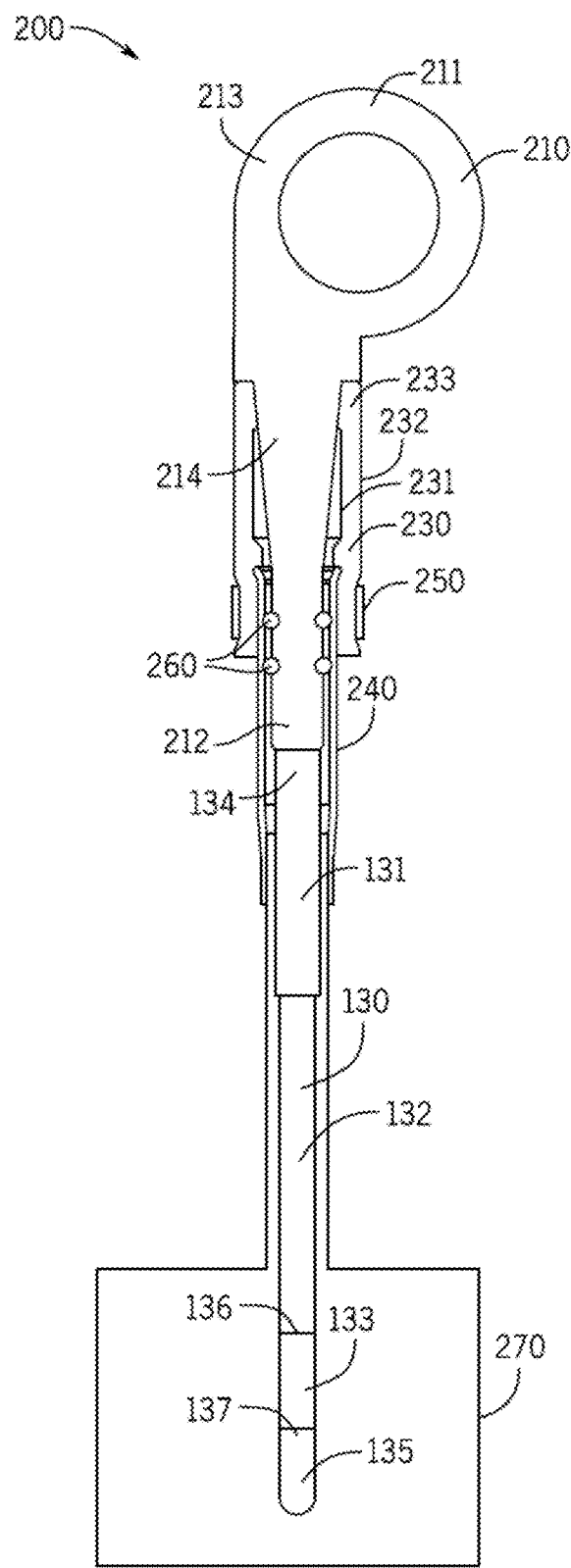
FIG. 3 illustrates a side cross-sectional view of a dipstick assembly according to another exemplary embodiment of the present disclosure.

FIG. 3 illustrates a side cross section view of a dipstick assembly 200 according to another exemplary embodiment of the present disclosure. The dipstick assembly 200 includes a handgrip 210, a rod 130, and a cleaning element or cleaning pad 230. In some examples, the dipstick assembly 200 may further include a fitting 240, a pipe clamp 250, and one or more O-rings 260. The handgrip 210 is attached to the rod 130. In some examples, the handgrip 210 may have a larger cross-sectional area than the rod 130. FIG. 3 illustrates the dipstick assembly 200 in a position in which the handgrip 210 is accommodated in the cleaning element 230. In this example, the cleaning element 230 is secured to an opening of an oil reservoir 270. The oil reservoir 270 may be connected to a combustion engine. The dipstick assembly 200 is configured so that the handgrip 210 and the rod 130 may be moved relative to the cleaning element 230. The rod 130 may be the same as the rod 130 discussed above with respect to the dipstick assembly 100 of FIG. 1.

As illustrated in FIG. 3, the handgrip 210 may be configured to extend through the cleaning element 230 when the handgrip 210 is accommodated in the cleaning element 230. The handgrip 210 may include an annular grip 213 located at the handgrip top end 211. The handgrip 210 may include a tapered portion 214 in which a cross sectional area of the handgrip 210 is gradually reduced. The tapered portion 214 of the handgrip 210 may be disposed in the cleaning element 230 when the handgrip 210 is accommodated in the cleaning element 230 as illustrated in FIG. 3.

The rod 130 is attached to the handgrip bottom end 212. In some examples, a glue or adhesive may be used to secure or attach the rod 130 to the handgrip bottom end 212. In other examples, the handgrip 210 (e.g., a portion of the handgrip bottom end 212) may circumscribe the rod 130. The handgrip 210 may apply a compressive force to the rod 130 securing or attaching the rod 130 to the handgrip 210. The cross-sectional shape of the rod 130 may vary. In some examples, the rod 130 may have a rectangular cross section. In other examples, the rod 130 may have an oblong or a circular cross section. The rod 130 may include a connecting element 131 and a measuring element 132. The connecting element 131 may include the rod first end 134 (e.g., a rod top end) and extend to the rod measuring element 132. The rod measuring element 132 may extend from the rod connecting element 131 to the rod second end 135. The rod measuring element 132 may include a measuring area 133 including a first mark 136 and a second mark 137. The measuring area 133 including the first mark 136 and the second mark 137 may be the same as those discussed above with the respect to the dipstick assembly 100 of FIG. 1.

In some examples, the connecting element 131 may have a larger cross-sectional area than the measuring element 132. In some examples, the connecting element 131 and the measuring element 132 may have the same cross-sectional area. In other examples, the measuring element may have a larger cross-sectional area than connecting element. In some examples, the connecting element 131 and the measuring element 132 may have the same cross-sectional shape. In other examples the connecting element 131 and the measuring element may have different cross-sectional shapes. For example, the connecting element 131 may have a larger diameter than the measuring element 132. In some examples, the connecting element 131 and the measuring element 132 may be comprised of the same material. In other examples, the connecting element 131 and the measuring element 132 may be comprised of the same material.

The cleaning element 230 is configured to accommodate the hand grip 210. The cleaning element 230 is configured to receive the handgrip 210 and the rod 130 such that the handgrip 210 may extend through the cleaning element 230. The cleaning element 230 is configured to deform elastically such that the cleaning element may be brought into contact with the rod 130, cleaning the rod 130 when the handgrip 210 and the rod 130 are moved (e.g., vertically) relative to the cleaning element 230. The cleaning element 230 is secured to an opening of an oil reservoir 270. In some examples, the cleaning element 230 may be secured to the opening of an oil reservoir 270 using a fitting 240 and a pipe clamp 250. The fitting 240 may connect the cleaning element 230 and the opening of the oil reservoir. For example, the fitting may be disposed within the cleaning element interior surface 231. A bottom portion of the fitting 240 may extend into the opening of the oil reservoir contacting an inner surface of the oil reservoir opening. The fitting 240 may be the same shape and/or size as the opening in the oil reservoir 270. In some examples, the fitting 240 may be fixed within the opening of the oil reservoir 270 by inserting the fitting 240 into the oil reservoir opening.

The top portion of the fitting 240 may extend into the cleaning element 230. In some examples, the cleaning element 230 may be inserted over the top portion of the fitting 240. The cleaning element 230 may circumscribe the top portion of the fitting 240. The pipe clamp 250 may be inserted over the cleaning element 230. The pipe clamp 250 may circumscribe the cleaning element 230. The pipe clamp 250 may circumscribe a portion of the cleaning element 230 in which the fitting 240 extends into the cleaning element 230. The pipe clamp 240 may be tightened such that the pipe clamp 240 secures the cleaning element 230 to the fitting 240. The handgrip bottom end 212 may extend in to the fitting 240 when the handgrip 210 is accommodated in the cleaning element 230.

The cleaning element 230 may be configured to deform elastically. For examples, the cleaning element 230 may be configured to deform elastically inward in response to a force applied to a cleaning element outer surface 232. The cleaning element 230 may elastically deform to be brought into contact with the hand grip 210 and/or the rod 130. For example, the cleaning element 230 may be compressed (e.g., elastically deformed) while the handgrip 210 and rod 130 are being removed from the cleaning element 230 such that the cleaning element 230 contacts the surface of the rod 130 removing oil from the rod 130. After the cleaning element 230 is compressed, the cleaning element 230 may return to its original shape. In some examples, the cleaning element may be comprised of an oleophobic material. In other examples, one or more oleophobic coatings may be applied to the cleaning element 230. The oleophobic material and/or coating may cause the oil removed from the rod 130 during cleaning to fall back into the reservoir, without sticking to the cleaning element.

The cross-sectional shape formed by the cleaning element interior surface 231 may vary. In some examples, the cleaning element interior surface 231 may form a rectangular shape. In other examples, the cleaning element interior surface 231 may form an oblong or circular shape. In some examples, the cleaning element interior surface 231 may form a shape the same as the cross-sectional shape of the rod 130. In other embodiments, the cleaning element interior surface 231 may form a different shape than the cross-sectional shape of the rod 130. The cross sectional shape formed by the cleaning element interior surface, when the cleaning element is in a natural or uncompressed state, may be larger than the cross sectional shape of rod 130. The cross sectional shape formed by the cleaning element interior surface 231 may circumscribe the cross sectional shape of the rod 130.

As illustrated in FIG. 3, the cleaning element top end 233 and the cleaning element interior surface 231 proximate to the top end may be configured to contact the handgrip 210 when the handgrip 210 is accommodated in the cleaning element 230. In some examples, as illustrated in FIG. 3, only the cleaning element interior surface 231 proximate to the cleaning element top end 233 may be configured to contact the handgrip 210 when the handgrip 210 is accommodated in the cleaning element 230. The cleaning element interior surface 231 proximate to the cleaning element top end 233 may be configured to contact the tapered portion 214 of the handgrip 210.

In some examples, the dipstick assembly 200 may further include one or more O-rings 260. The one or more O-rings 260 may be attached or secured to the handgrip 210 proximate to the handgrip bottom end 212. The one or more O-rings 260 may contact the fitting 240 when the handgrip 210 is accommodated in the cleaning element 230 as illustrated in FIG. 3. For example, the one or more O-rings 260 may contact the fitting 240 when the handgrip 210 is fully inserted into the cleaning element 230 (e.g., when the handgrip 210 contacts a top end 233 of the cleaning element), securing the handgrip within the cleaning element 230 and fitting 240. The one or more O-rings 260 may help secure the handgrip 210 within the cleaning element 230 and the fitting 240 when the handgrip 210 is accommodated in the cleaning element 230 as illustrated in FIG. 3.

Figure 4:
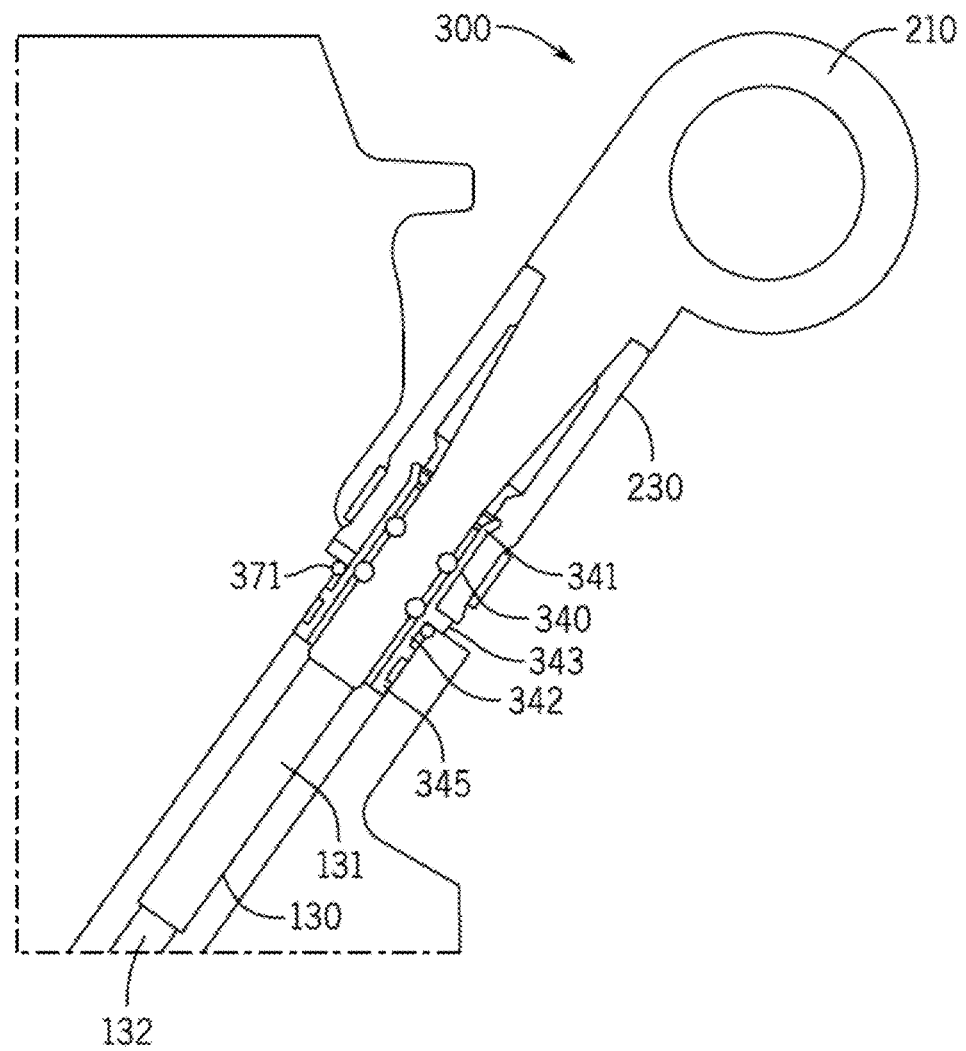
FIG. 4 illustrates a side cross sectional view of a dipstick assembly according to yet another exemplary embodiment of the present disclosure.

FIG. 4 illustrates a side cross section view of a dipstick assembly 300 according to an exemplary embodiment of the present disclosure. The dipstick assembly 300 includes a handgrip 210, a rod 130, and a cleaning element 230. The handgrip 210, rod 130, and cleaning element 230 may be the same as those discussed above with respect to the dipstick assembly 200 of FIG. 3. The dipstick 300 assembly may further include a fitting 340, a pipe clamp 250 and one or more O-rings 260. The pipe clamp 250 and the one or more O-rings 260 may be the same as those discussed above with respect to the dipstick assembly 200 of FIG. 3. As illustrated in FIG. 4, the handgrip 210 and the rod 130 may be disposed within the cleaning element 230 and fitting 340 so as to be at an angle.

As illustrated in FIG. 4, the dipstick assembly 300 is secured to an oil reservoir opening 371. Specifically, the cleaning element 230 may be secured to the oil reservoir opening 371 via the fitting 340 and the pipe clamp 250. The fitting 340 may include a fitting top portion 341, a fitting bottom portion 342, and a fitting middle portion 343. The fitting top portion 341 may be disposed within the cleaning element 230. The cleaning element 230 may circumscribe the fitting top portion 341. The pipe clamp 250 may circumscribe the cleaning element 230. For example, the pipe clamp 250 may circumscribe the cleaning element 230 along a portion of the cleaning element 230 corresponding to or the same as the portion of the cleaning element 230 in which the fitting top portion 341 is inserted. The pipe clamp 250 may be tightened around the cleaning element 230 to compress or squeeze the cleaning element 230 against the fitting top portion 341, securing the cleaning element 230 to the fitting 340.

The fitting bottom portion 342 may be inserted into the oil reservoir opening 371. The fitting bottom portion 342 may be secured to the oil reservoir opening 371 by inserting the fitting bottom portion 342 into the oil reservoir opening. The fitting bottom portion 342 may include one or more protrusions 345. The one or more protrusions 345 may contact an inner surface of the oil reservoir opening 371, securing the fitting 340 within the oil reservoir opening 371. In some embodiments, the one or more ridges 345 may be configured to deform as the fitting 340 is inserted into the oil reservoir opening 371. The fitting middle portion 343 may be disposed between the fitting top portion 341 and the fitting bottom portion 342. The fitting middle portion 343 may contact both the cleaning element 230 and the oil reservoir opening 371 when the cleaning element 230 is attached to the oil reservoir opening 371.

Figure 5:
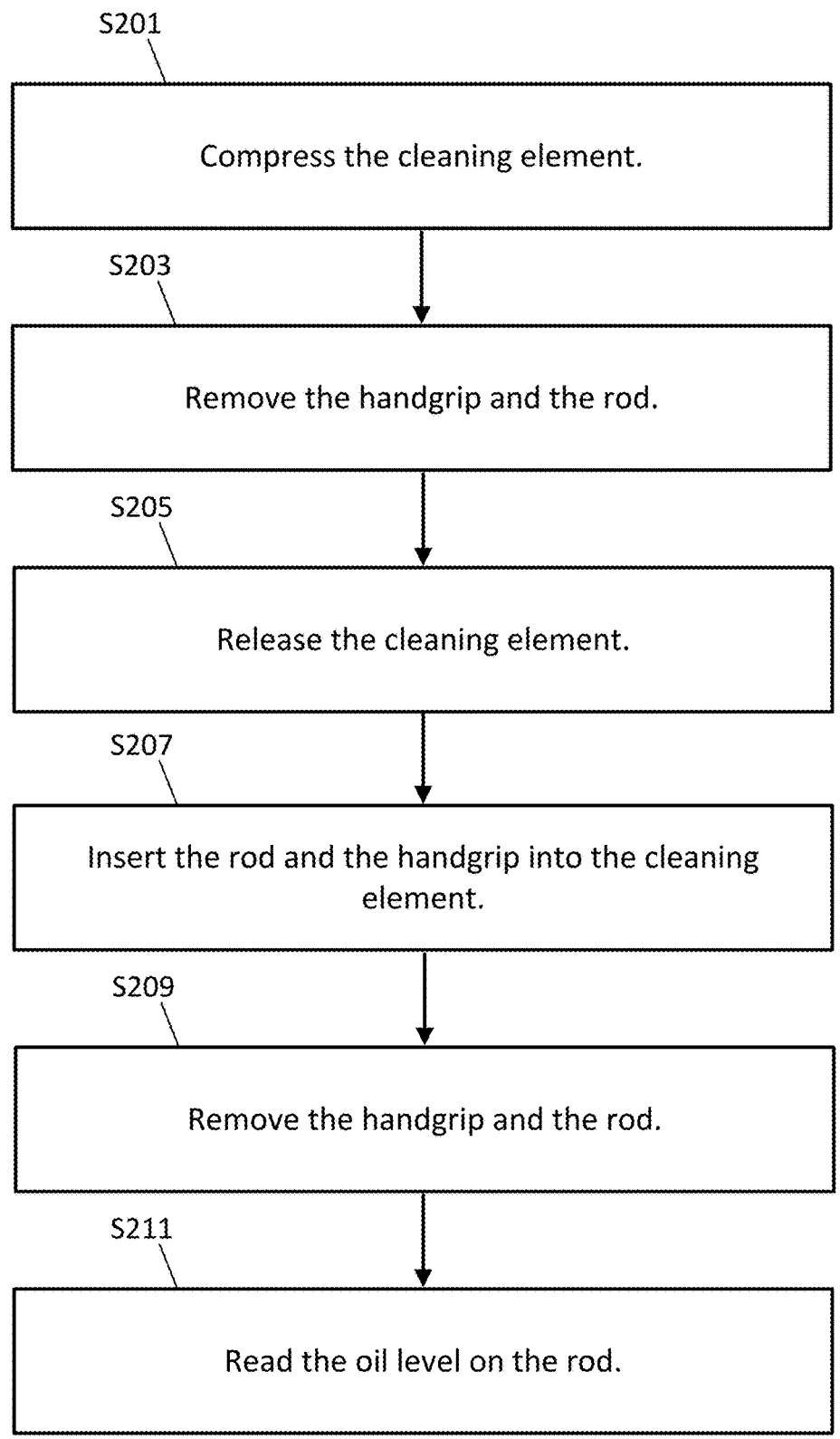
FIG. 5 illustrates a flow chart for a method of checking an oil level according to an exemplary embodiment of the present disclosure.

FIG. 5 illustrates a flow chart for a method of checking an oil level according to an exemplary embodiment of the present disclosure. The method of claim 5 may be used with the various dipstick assemblies disclosed herein. For example, the method of FIG. 5 may be used with the dipstick assemblies 200 or 300. Additional, fewer, or different acts may be provided. The method of FIG. 5 may begin when the handgrip 210 is accommodated in the cleaning element 230 as illustrated in FIGS. 3 and 4.

At act S201, the cleaning element 230 is compressed. The cleaning element 230 may elastically deform to contact the handgrip 210 when the cleaning element 230 is compressed. Specifically, the cleaning element 230 may deform such that the cleaning element interior surface 231 contacts the handgrip 210. The cleaning element interior surface 231 may contact the tapered portion 214 of the handgrip 210.

At act S203, the handgrip 210 and the rod 130 are removed from the cleaning element 230 while the cleaning element 230 is still compressed and elastically deformed. As the handgrip 210 and rod 130 are removed from the cleaning element 230, the cleaning element interior surface 231 may contact the rod 130. As the cleaning element interior surface 231 contacts the rod 130, the cleaning element interior surface 231 may remove oil from the surface of the rod 130.

At act S205, the compressive force applied to the cleaning element 230 is released. As the compressive force applied to the cleaning element is released, the cleaning element 230 may return to its original shape (e.g., the shape of cleaning element 230 as illustrated in FIG. 3). The cleaning element 230 may be configured to elastically deform such that it returns to its original shape.

At act S207, the rod 130 and handgrip 210 are inserted into the cleaning element 230. The rod 230 may be inserted into the handgrip 210 to extend through the handgrip 210 and the cleaning element 230 into the oil reservoir. The handgrip 210 and rod 130 may be inserted into the cleaning element 230 so as to be accommodated in the cleaning element 230 as illustrated in FIG. 3. Accordingly, the handgrip 210 may contact only the cleaning element top end 233 and the cleaning element interior surface 231 proximate to the cleaning element top end 233.

At act S209, the handgrip 210 and the rod 130 are removed from the cleaning element 230. The handgrip 210 and the rod 130 are removed from the cleaning element 230 while the cleaning element 230 is in its original or natural shape (e.g., the shape as illustrated in FIG. 3). As the handgrip 210 and the rod 130 are withdrawn or removed from the cleaning element 230, the rod 130 does not contact the cleaning element interior surface 231. Accordingly, as the rod 130 is removed through the cleaning element 230 any oil on the surface of the rod 130 will remain on the rod 130.

At act S211, an oil level on the rod is read (e.g., measured). At act S211, the oil may be visibly present on the rod 130. For example, the oil may be visibly present on the measuring area 133 of the rod 130. The first mark 136 and/or second mark 137 in the measuring area may be used to determine an amount of oil in the oil reservoir. After the oil level is measured, the handgrip 210 may be inserted into the cleaning element 230.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A dipstick assembly comprising:
    a first handle attached to an end of a rod;
    a second handle including a second handle opening, the second handle opening configured to receive the first handle and the rod; and
    a cleaning pad disposed at a bottom end of the second handle, the cleaning pad configured to receive the rod and configured to contact the rod and clean the rod when the first handle and the rod are moved vertically relative to the second handle and the cleaning pad;
    wherein the cleaning pad circumscribes the second handle.

2. The dipstick assembly of claim 1, wherein an interior surface of the cleaning pad diverges towards an outer surface of the cleaning pad at a bottom end of the cleaning pad.

3. The dipstick assembly of claim 1, wherein the rod includes a connecting element and a measuring element.

4. The dipstick assembly of claim 1, wherein the second handle includes an annular grip area.

5. The dipstick assembly of claim 1, wherein the first handle circumscribes the rod.

6. The dipstick assembly of claim 1, further comprising:
    a channel extending from the second handle opening through the second handle,
    wherein the channel includes a converging portion configured to accommodate a portion of the first handle and a portion of the rod.

7. The dipstick assembly of claim 1, further comprising an O-ring secured to the second handle configured to secure the second handle to an opening in an oil reservoir.

8. A dipstick assembly comprising:
    a handgrip attached to an end of a rod;
    an opening in a reservoir configured to store a liquid; and
    a cleaning pad secured to the opening, the cleaning pad configured to receive the handgrip and the rod such that the handgrip may extend through the cleaning pad, the cleaning pad configured to deform elastically such that the cleaning pad is configured to be brought into contact with the rod to clean the rod when the handgrip and rod are moved vertically relative to the cleaning pad.

9. The dipstick assembly of claim 8, wherein the handgrip has a larger cross-sectional area than the rod.

10. The dipstick assembly of claim 8, wherein the rod includes a connecting element and a measuring element.

11. The dipstick assembly of claim 10, wherein the connecting element has a larger cross-sectional area than the measuring element.

12. The dipstick assembly of claim 8, further comprising:
a fitting disposed between the opening and the cleaning pad, the fitting configured to secure the cleaning pad to the opening.

13. The dipstick assembly of claim 12, wherein the cleaning pad circumscribes the fitting and wherein a pipe clamp circumscribes the cleaning pad, securing the cleaning pad to the fitting.

14. The dipstick assembly of claim 12, wherein the fitting includes one or more protrusions configured to contact an inner surface of the opening in the reservoir.

15. The dipstick assembly of claim 8, wherein the cleaning pad is in contact with the handgrip when the handgrip is fully inserted into the opening.

16. The dipstick assembly of claim 8, wherein the cleaning pad has a top end which is exposed when the handgrip is fully inserted into the opening.

17. An engine assembly comprising:
a combustion engine;
an oil reservoir coupled to and in fluid communication with the combustion engine, the reservoir including a reservoir opening; and
a dipstick assembly including:
a first handle attached to an end of a rod;
a second handle including a second handle opening, the second handle opening configured to receive the first handle and the rod; and
a cleaning pad disposed at the bottom of the second handle, the cleaning pad configured to receive the rod and contact the rod to clean the rod when the first handle and the rod are moved vertically relative to the second handle and the cleaning pad;
wherein the cleaning pad circumscribes the second handle.

18. The engine assembly of claim 17, wherein an interior surface of the cleaning pad diverges towards an outer surface of the cleaning pad at a bottom end of the cleaning pad.

19. The engine assembly of claim 17, wherein the first handle circumscribes the rod.

\* \* \* \* \*